United States Patent
Meyer

(10) Patent No.: US 12,141,087 B2
(45) Date of Patent: Nov. 12, 2024

(54) METHODS AND APPARATUS FOR DATA DESCRIPTORS FOR HIGH SPEED DATA SYSTEMS

(71) Applicant: GigaIO Networks, Inc., Carlsbad, CA (US)

(72) Inventor: Doug Meyer, El Cajon, CA (US)

(73) Assignee: GigaIO Networks, Inc., Carlsbad, CA (US)

( * ) Notice: Subject to any disclaimer, the term of this patent is extended or adjusted under 35 U.S.C. 154(b) by 0 days.

(21) Appl. No.: 17/752,621

(22) Filed: May 24, 2022

(65) Prior Publication Data

US 2022/0283975 A1  Sep. 8, 2022

Related U.S. Application Data

(63) Continuation of application No. 17/079,288, filed on Oct. 23, 2020, now Pat. No. 11,392,528.
(Continued)

(51) Int. Cl.
*G06F 13/40* (2006.01)
*G06F 12/1081* (2016.01)
(Continued)

(52) U.S. Cl.
CPC ...... *G06F 13/4027* (2013.01); *G06F 12/1081* (2013.01); *G06F 13/28* (2013.01); *G06F 13/4234* (2013.01); *G06F 2213/3808* (2013.01)

(58) Field of Classification Search
None
See application file for complete search history.

(56) References Cited

U.S. PATENT DOCUMENTS 5,903,627 A   5/1999   Shaffer et al.
6,721,316 B1   4/2004   Epps et al.
(Continued)

FOREIGN PATENT DOCUMENTS

CN   100401709 C   7/2008
CN   102196503 A   9/2011
(Continued)

OTHER PUBLICATIONS

PCI Express Base Specification Version 1.1 dated Mar. 8, 2005, 508 pages.
(Continued)

*Primary Examiner* — Michael Sun
(74) *Attorney, Agent, or Firm* — Patent Beach PC

(57) ABSTRACT

Methods and apparatus for improved data movement operations through interconnect fabric. In one embodiment, Non-Transparent Bridge (NTB) technology used to perform data movement operations between a host and multiple peer devices using a DMA (direct memory access) engine and at least one descriptor ring having enhanced descriptor entries. In one implementation, descriptor ring entries include source and destination address information, address translation information, and fabric partition information. In one implementation, a DMA engine is configured directly access host memory and generate data packets using the descriptor entry information. In one embodiment, the descriptor ring is a virtual descriptor ring located on DMA hardware, host memory, or elsewhere in the NT fabric address space, and may be accessed by user processes.

16 Claims, 15 Drawing Sheets

Related U.S. Application Data

(60) Provisional application No. 62/926,214, filed on Oct. 25, 2019.

(51) Int. Cl.
*G06F 13/28* (2006.01)
*G06F 13/42* (2006.01)

(56) References Cited

U.S. PATENT DOCUMENTS

| | | | |
|---|---|---|---|
| 7,991,918 | B2 | 8/2011 | Jha et al. |
| 8,037,345 | B1 | 10/2011 | Iyer et al. |
| 8,271,996 | B1 | 9/2012 | Gould et al. |
| 8,429,325 | B1* | 4/2013 | Onufryk ............. G06F 13/4022 710/316 |
| 8,458,267 | B2 | 6/2013 | Chen et al. |
| 8,463,934 | B2 | 6/2013 | Maitra |
| 8,868,777 | B2 | 10/2014 | Maitra |
| 8,949,483 | B1 | 2/2015 | Martin |
| 9,152,593 | B2* | 10/2015 | Galles .................. G06F 13/409 |
| 9,152,597 | B2 | 10/2015 | Maitra |
| 9,223,737 | B1 | 12/2015 | Serebrin |
| 9,448,957 | B2 | 9/2016 | Maitra |
| 9,450,780 | B2 | 9/2016 | Wang et al. |
| 9,626,324 | B2 | 4/2017 | Chawla et al. |
| 10,756,816 | B1 | 8/2020 | Dreier |
| 10,887,238 | B2* | 1/2021 | Ramey ................ H04L 67/1008 |
| 11,403,247 | B2 | 8/2022 | Badger |
| 11,915,026 | B1 | 2/2024 | Chandrashekar et al. |
| 2001/0026546 | A1 | 10/2001 | Schieder et al. |
| 2002/0012356 | A1 | 1/2002 | Li et al. |
| 2002/0016940 | A1 | 2/2002 | Ju |
| 2002/0133618 | A1 | 9/2002 | Desai et al. |
| 2003/0105826 | A1 | 6/2003 | Mayraz |
| 2003/0172224 | A1 | 9/2003 | Gulick et al. |
| 2004/0090919 | A1 | 5/2004 | Callon et al. |
| 2004/0095883 | A1 | 5/2004 | Chu et al. |
| 2004/0125804 | A1 | 7/2004 | Lee |
| 2005/0160313 | A1 | 7/2005 | Wu |
| 2006/0174251 | A1 | 8/2006 | Pope et al. |
| 2006/0239287 | A1 | 10/2006 | Johnsen et al. |
| 2006/0242330 | A1 | 10/2006 | Torudbakken et al. |
| 2006/0282603 | A1 | 12/2006 | Onufryk et al. |
| 2006/0288129 | A1 | 12/2006 | Pope et al. |
| 2008/0010648 | A1 | 1/2008 | Ando et al. |
| 2008/0092148 | A1* | 4/2008 | Moertl ................ G06F 12/1009 719/321 |
| 2008/0186917 | A1 | 8/2008 | Wu et al. |
| 2009/0077277 | A1 | 3/2009 | Vidal et al. |
| 2009/0125666 | A1 | 5/2009 | Freking et al. |
| 2009/0199296 | A1 | 8/2009 | Xie et al. |
| 2009/0240874 | A1 | 9/2009 | Pong |
| 2009/0248947 | A1 | 10/2009 | Malwankar et al. |
| 2010/0064079 | A1 | 3/2010 | Harvey et al. |
| 2010/0085981 | A1 | 4/2010 | Gupta et al. |
| 2011/0202701 | A1 | 8/2011 | Maitra |
| 2011/0219421 | A1 | 9/2011 | Ullman et al. |
| 2011/0258337 | A1 | 10/2011 | Wang et al. |
| 2011/0302349 | A1 | 12/2011 | Griggs |
| 2012/0033680 | A1 | 2/2012 | Gopinath et al. |
| 2012/0166690 | A1 | 6/2012 | Regula |
| 2012/0281536 | A1 | 11/2012 | Gell et al. |
| 2013/0212165 | A1 | 8/2013 | Vermeulen et al. |
| 2013/0290967 | A1 | 10/2013 | Calciu et al. |
| 2014/0181454 | A1 | 6/2014 | Manula et al. |
| 2014/0219276 | A1 | 8/2014 | Jokinen et al. |
| 2014/0237156 | A1 | 8/2014 | Regula et al. |
| 2014/0344947 | A1 | 11/2014 | Kalyanasundharam et al. |
| 2014/0372657 | A1 | 12/2014 | Jones et al. |
| 2015/0026384 | A1 | 1/2015 | Maitra |
| 2015/0143016 | A1 | 5/2015 | Egi et al. |
| 2015/0222705 | A1 | 8/2015 | Stephens |
| 2015/0261709 | A1 | 9/2015 | Billi |
| 2016/0103783 | A1 | 4/2016 | Allen et al. |
| 2016/0134564 | A1 | 5/2016 | Egi et al. |
| 2016/0147676 | A1 | 5/2016 | Cha et al. |
| 2016/0154756 | A1* | 6/2016 | Dodson ............... G06F 13/4022 710/316 |
| 2016/0156973 | A1 | 6/2016 | Ullman et al. |
| 2016/0328339 | A1 | 11/2016 | Ozguner et al. |
| 2017/0070363 | A1 | 3/2017 | Watkins et al. |
| 2017/0206169 | A1 | 7/2017 | Coppola et al. |
| 2017/0264571 | A1 | 9/2017 | Aibester et al. |
| 2018/0083908 | A1 | 3/2018 | Dotan-Cohen et al. |
| 2018/0095914 | A1 | 4/2018 | Kondiles et al. |
| 2018/0159781 | A1 | 6/2018 | Mehta et al. |
| 2018/0247187 | A1 | 8/2018 | Chung et al. |
| 2018/0341619 | A1 | 11/2018 | Slik |
| 2019/0163378 | A1 | 5/2019 | Carlough et al. |
| 2019/0230161 | A1 | 7/2019 | Romem et al. |
| 2019/0324882 | A1 | 10/2019 | Borello et al. |
| 2020/0081858 | A1* | 3/2020 | Philmore ............ G06F 13/4027 |
| 2020/0117676 | A1 | 4/2020 | Ben Moshe et al. |
| 2020/0117844 | A1 | 4/2020 | Choi et al. |
| 2020/0310994 | A1 | 10/2020 | Chofleming et al. |
| 2021/0073158 | A1 | 3/2021 | Badger |
| 2021/0075745 | A1 | 3/2021 | Badger |
| 2021/0103535 | A1 | 4/2021 | Badger |
| 2021/0124706 | A1 | 4/2021 | Meyer |

FOREIGN PATENT DOCUMENTS

| | | | |
|---|---|---|---|
| CN | 103353851 | A | 10/2013 |
| CN | 106850803 | A | 6/2017 |
| CN | 112579263 | A | 3/2021 |
| EP | 3033681 | A1 | 6/2016 |
| EP | 3850493 | A1 | 7/2021 |
| EP | 4028859 | A1 | 7/2022 |
| EP | 4029219 | A1 | 7/2022 |
| EP | 4038494 | A2 | 8/2022 |
| JP | 3809674 | B2 | 8/2006 |
| WO | WO-2008157470 | A1 | 12/2008 |
| WO | WO-2009120798 | A2 | 10/2009 |
| WO | WO-2018102276 | A1 | 6/2018 |
| WO | WO-2020055921 | A1 | 5/2020 |
| WO | WO-2021050762 | A1 | 3/2021 |
| WO | WO-2021050763 | A1 | 3/2021 |
| WO | WO-2021067818 | A2 | 4/2021 |
| WO | WO-2021081409 | A1 | 4/2021 |

OTHER PUBLICATIONS

PCI Express Base Specification Version 2.0 dated Dec. 20, 2006, 608 pages.
PCI Express Base Specification Version 2.1 dated Mar. 4, 2009, 704 pages.
PCI Express Base Specification Version 3.0 dated Oct. 23, 2014, 860 pages.
PCI Express Base Specification Version 3.1 dated Dec. 7, 2015, 1075 pages.
Buntinas D., et al., "Implementation and Evaluation of Shared-Memory Communication and Synchronization Operations in MPICH2 using the Nemesis Communication Subsystem," Parallel Computing, Jun. 2007, pp. 1-17. URL: <url: https://www.mcs.anl.gov/uploads/cels/papers/P1346A.pdf </url:.
Dittia Z., et al., "DMA Mechanisms for High Performance Network Interfaces," 2007,15 pages. [Retrieved from Internet] (URL: https://www.semanticscholar.org/paper/DMA-Mechanisms-for-High-Performance-Network-Dittia-Cox/23fae6a2d6ce3ce922fc8571e0ada0519ffe8057 ).
Kristiansen, L.B., "PCIe Device Lending: Using Non-Transparent Bridges to Share Devices," Master's Thesis Spring 2015, UiO Department of Informatics, University of Oslo, 96 pages.
PCI Express Base Specification Version 1.0a, 2003.
PCI Express Base Specification Version 5.0 dated Jun. 5, 2018, 1311 pages.
PCI Express Base Specification Revision 4.0 dated Oct. 5, 2017, 1354 pages.
Shipman G. M., et al., "Investigations on InfiniBand: Efficient Network Buffer Utilization at Scale," Investigations on InfiniBand,

(56) References Cited

OTHER PUBLICATIONS 2007, pp. 178-186. URL: <url: http://citeseerx.ist.psu.edu/viewdoc/download?doi=10.1.1.89.3001&rep=rep1&type=pdf </url:.
Tu C., et al., "Marlin: A Memory-Based Rack Area Network," IEEE Xplore, 2014, 11 pages.
Yu, W., et al., "Adaptive Connection Management for Scalable MPI over InfiniBand," IEEE Xplore, Jun. 2006, pp. 1-10. URL: <url: https://ieeexplore.ieee.org/document/1639338 </url:.
Katsinis C., et al., "The Performance of Parallel Matrix Algorithms on a Broadcast-based Architecture", Concurrency and Computation: Practice and Experience, vol. 18(3), 2005, pp. 271-303.

\* cited by examiner

METHODS AND APPARATUS FOR DATA DESCRIPTORS FOR HIGH SPEED DATA SYSTEMS

PRIORITY AND RELATED APPLICATIONS

This application is a continuation of and claims priority benefit to co-pending U.S. patent application Ser. No. 17/079,288 filed Oct. 23, 2020 and entitled "METHODS AND APPARATUS FOR DMA ENGINE DESCRIPTORS FOR HIGH SPEED DATA SYSTEMS", which claims priority benefit of U.S. Provisional Patent Application Ser. No. 62/926,214 filed Oct. 25, 2019 and entitled "METHODS AND APPARATUS FOR DMA ENGINE DESCRIPTORS FOR HIGH SPEED DATA SYSTEMS," each of the foregoing which is incorporated herein by reference in its entirety.

This application is also generally related to the subject matter of co-owned and co-pending U.S. patent application Ser. No. 17/061,366 filed Oct. 1, 20202 and entitled "METHODS AND APPARATUS FOR FABRIC INTERFACE POLLING," which is incorporated herein by reference in its entirety.

This application is generally related to the subject matter of co-pending U.S. patent application Ser. No. 17/016,269 filed Sep. 9, 2020 and entitled METHODS AND APPARATUS FOR IMPROVED POLLING EFFICIENCY IN NETWORK INTERFACE FABRICS, incorporated herein by reference in its entirety.

This application is also generally related to the subject matter of U.S. patent application Ser. No. 16/566,829 filed on Sep. 10, 2019 and entitled "METHODS AND APPARATUS FOR HIGH-SPEED DATA BUS CONNECTION AND FABRIC MANAGEMENT," and U.S. patent application Ser. No. 17/016,228 filed Sep. 9, 2020 and entitled "METHODS AND APPARATUS FOR NETWORK INTERFACE FABRIC SEND/RECEIVE OPERATIONS," each incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data buses, interconnects and networking and specifically, in one or more exemplary embodiments, to methods and apparatus for providing improved fabric interface and DMA engine operation in, for instance, PCIe-based systems.

2. Description of Related Technology

Existing PCI/PCIe Topology

FIG. 1 illustrates a typical prior art PCIe-based architecture 100, wherein a parallel bus approach is utilized. Generally speaking, PCIe buses have a tree topology with fan-out capabilities at each interior node. As shown in FIG. 1, the <bus, device, function> hierarchy is employed; i.e., a bus 102 supports one or more devices 104 which each may support a plurality of functions 106. PCIe (single lane (x1)) uses 18 pins (there are x4, x8, and x16 variants with higher pin counts).

PCIe uses a "Master/Slave" control model; the root complex 101 (FIG. 1) is a single master to the PCIe bus. The root complex 101 is the trunk of the tree topology; subsequent layers of hierarchy are the branches.

PCIe bus enumeration provides a memory-mapped interface, wherein transactions are direct accesses to memory; a read to virtual address is a read to the physical address that corresponds to that virtual address. Memory-mapped accesses are generally faster and more powerful than non-memory-mapped interfaces (e.g., packet based accesses, etc.).

FIG. 2 illustrates a typical prior art PCIe memory-mapping architecture 200. As illustrated, the exemplary processor 202 in the architecture 200 can access (read/write) any physical address by: 1) performing the access according to a virtual address (32b); 2) the MMU 204 translates the processor's virtual address to a physical address (48b); and 3) the MMU 204 converts the physical address to the IO virtual address (Xb).

Non-Transparent Bridges (NTBs)

Virtually, PCIe NTBs allow TLPs (transaction layer packets) to be translated between multiple roots. Roots can communicate with one another (each root views the other as a device, subject to certain limitations), as well as devices 104 further down in the hierarchy as shown in FIG. 3.

As shown in FIG. 4, each processor 202*a*, 202*b* has its own memory-map implemented via its respective MMU 204*a*, 204*b*.

Existing NTBs are designed for peripherals, and do not scale for multiple processors. Even though each processor 202*a*, 202*b* can interact with the other processors as "devices," this interaction is significantly limited; for example, there are limited access rights, limited interrupt translations (programmable IO to MSI), and other associated overhead. Existing implementations of NTB are effectively limited to N=2 to 4 roots 101 (e.g., processors 204*a*, 204*b*), as shown in FIG. 5.

In some extant approaches, NTB data movement between hosts in enabled by (i) some manner of "translation channel" which is addressed with an NTB endpoint's PCIe physical address on the host's RC side, and a translated address on the NT fabric side (wherein TLPs passing through the Translation Frame are modified and routed to one or more NT fabric destinations or "partitions"); and (ii) some manner of engine which generates TLPs with NTB EP (endpoint) PCIe physical addresses (this is typically a CPU or DMA engine, which is simply the source of TLPs sent through a translation channel).

When a host (root) device boots up, it enumerates (using BIOS) its PCI BUS and queries each endpoint to determine how large its Base Address Register (BAR) space is. The host has a certain amount of allocated IO memory space that it attempts to divide and assign address ranges to all the BARs and all the devices that it has enumerated. However, issues may occur if a device's BAR requires a large amount of address space to be assigned (e.g., BAR spaces that exceed 512 Gb); e.g., such large space requirements may not be able to be satisfied.

Further, for every peer that a host finds through an NT EP (and to which access is desired), the NT EP requires a large window of BAR physical address space (e.g., 32 Gb) that routes to each one of those peer hosts. Thus, a conventional NT fabric connected to a large number of host devices would necessitate enormous amounts of physical address space on its NTB devices. This is not only not optimal but in some cases not feasible, especially as the system topology expands.

Accordingly, based on the foregoing, there is inter alia, a need for improved methods and apparatus that enable, inter alia, scaling of interconnect fabric to allow data movement between multiple hosts without relying on unreasonably large amounts of BAR space.

SUMMARY

The present disclosure satisfies the foregoing needs by providing, inter alia, methods and apparatus for improved NTB and fabric operation and DMA engine.

In one aspect of the disclosure, an architecture utilizing a descriptor as a lookup table (LUT) is described. In one embodiment of the architecture, a DMA descriptor for a DMA engine which is logically proximate with a non-transparent (NT) endpoint (EP) is used to provide both a translation channel and DMA engine functionality. In one implementation, a translation channel to each peer within the architecture is provided such that no NT configuration changes are required beyond initialization (which may be performed statically or dynamically one time).

In another aspect of the disclosure, a DMA (direct memory access) engine configured for use with interconnect fabric is disclosed. In one embodiment, the engine includes at least one descriptor ring (e.g., assigned memory registers), and the descriptor ring is configured to store a descriptor entry; e.g., a look-up table (LUT) entry. In one variant, the DMA engine is located within a non-transparent endpoint (NT EP) of a non-transparent bridge (NTB) associated with an interconnect fabric. The descriptor ring is for example a virtual descriptor ring located on DMA hardware, host memory, or elsewhere in the NT fabric address space, and may be accessed by user processes.

In one implementation, the NT fabric includes a host and multiple peer devices, such that the host and each of the peer devices have their own descriptor rings corresponding to the DMA engine. In one configuration, the descriptor ring entry includes information related to a translation channel and an engine.

In another embodiment, the descriptor ring entry includes information for a multicast or broadcast operation. In one variant, the descriptor includes a multicast mask including information related to multiple fabric partitions. The descriptor ring may include multiple descriptor rings, wherein each descriptor ring is associated with a different user process of a host processor such that individual user processes can directly post data movement requests to their own descriptor rings.

In another embodiment, the translation channel information includes PCIe physical address range, channel size, translation base address, translation mask, destination, NT fabric requester ID, and the engine information includes: source address, destination address, size of transfer. In one implementation, the LUT includes at least one entry with an address translation rule and a fabric partition address or ID (e.g., a physical address of an NT EP of the partition). In one implementation, the fabric partition ID is an internal fabric ID associated with the partition.

In another embodiment, the DMA engine includes a process or apparatus to improve security of data transfers, including, for example, an ability in include TLP prefix information (e.g., vendor-defined prefixes and/or PCIe standard prefixes such as PASID).

In another aspect of the disclosure, a non-transparent (NT) interconnect fabric allowing data movement between multiple hosts is disclosed. In one embodiment, the NT fabric includes a plurality of partitions, each including a port and a NT EP. In one variant, the NT fabric includes a DMA engine residing within or in close conjunction with at least one of the NT EPs. The DMA engine is configured to read entries on at least one descriptor ring associated with the at least one of the NT EPs, wherein the entries include source address, destination address, address translation, and fabric partition information.

In another aspect, a method of operating an interconnect fabric is disclosed. In one embodiment, the method includes using at least one descriptor ring having enhanced descriptor entries and at least one DMA engine configured to read the entries.

In another aspect, a method of simplifying address translation operations is disclosed. In one embodiment, the method supports enhanced scaling of host and EPs within one or more fabrics.

In another aspect, a method of minimizing required BAR (base address register) space within a computerized device is disclosed.

In a further aspect, a method of improving scalability of non-transparent (NT) interconnect fabric is disclosed. In one embodiment, the method includes providing a fabric node with an enhanced DMA engine and at least one enhanced descriptor ring. In one variant, the method is configured to add host devices to NT fabric without using additional LUT resources.

In yet another aspect, a method of performing data movement within an NT (non-transparent) fabric is disclosed. In one embodiment, data movement includes sending or receiving TLP(s) through NT fabric. In one variant, the NT fabric includes fabric partitions, including NT Endpoints connected to host devices (processors) through ports. In one embodiment, blocks of NT fabric data movement may be placed in descriptors located in the NT fabric. The descriptors contain for example specification of a fabric "trigger" to initiate the data movement. In one implementation, the completion of one data transfer sends a trigger to a particular NT DMA engine elsewhere in the fabric to begin a transfer. In one such approach, no interrupt or polling mechanism involving kernel/CPU processing is used to initiate a follow-on DMA.

In one configuration, the method of data movement is used in data-flow (pipeline) applications. In one embodiment, the data movement is part of PCIe data transactions.

In still another aspect, a computer-readable medium having a storage apparatus including executable instructions is disclosed. In one embodiment, the instructions are configured to, when executed on a processor: access information related to a descriptor entry; write a descriptor entry to a DMA descriptor ring using the information, enable a DMA engine to read the descriptor entry, and enable the DMA engine to generate a data packet using information of the descriptor entry.

In a further aspect, a method of operating a data fabric is disclosed. In one embodiment, the method includes: receiving a packet at a first address space from a first device; editing the received packet by at least: (i) based at least on the first address space, editing a read address of the received packet to a first translated address; and (ii) editing a first identifier associated with the received packet to a second identifier; routing the edited received packet through the data fabric to a second device; receiving a reply to the routed edited received packet; and causing writing data associated with the reply to the first device.

In one variant, the first and second devices each comprise hosts associated with the data fabric, and at least the acts of receiving and editing are performed by a non-transparent endpoint (NT EP), and the receiving a packet at a first address space comprises receiving a transaction layer packet (TLP) addressed to a physical address of a BAR (base address register) of the NT EP.

In one implementation, the routing the edited received packet through the data fabric to a second device comprises routing the TLP to a second NT EP associated with the second device.

In another variant, the editing a first identifier associated with the received packet to a second identifier comprises editing a requester identifier into a proxy identifier, and the receiving a reply to the routed edited received packet comprises receiving the reply based on the proxy identifier.

In one implementation, the writing data associated with the reply to the first device further comprises correlating the proxy identifier to the first device.

In yet another variant, the editing, based at least on the first address space, of a read address of the received packet to a first translated address comprises using translation data within a lookup table (LUT) associated with a BAR space.

In a further aspect, a computer readable apparatus comprising a storage medium having at least one computer program thereon, is disclosed. In one embodiment, the at least one computer program is configured to, when executed: receive from a first device an entry at a data structure associated with a data fabric; read the received entry; based at least on the reading, access first data within a storage device; generate at least one packet based at least on the accessed first data; cause transmission of the at least one packet via at least the data fabric to a target; receive a response to the at least one packet issued by the target; evaluate at least a portion of the received response; and based at least on the evaluation, cause provision of the received response to the first device.

In one variant, the data structure comprises a DMA (direct memory access) descriptor ring; and the reading of the received entry comprises reading the entry using a DMA engine process.

In one implementation, the access of the first data in the storage device comprises access of data within a prescribed address range within a memory; and the generation of the at least one packet comprises generation of a transaction layer packet (TLP).

In another implementation, the generation of the transaction layer packet (TLP) comprises (i) utilization of a source ID value associated with the first device for the TLP; and (ii) utilization of a particular NT EP (non-transparent endpoint) memory address as a destination address for the TLP.

In a further implementation, the first device comprises a first host device associated with a first NT EP (non-transparent endpoint) of the fabric; the target comprises a second host device associated with a second NT EP of the fabric; and the causation of transmission of the at least one packet via at least the data fabric to the target comprises causation by the DMA engine of transmission of the TLP to the second NT EP.

In another variant, the data fabric comprises a non-transparent and PCIe (Peripheral Component Interconnect express) compliant fabric.

In another aspect, a computerized node in a non-transparent interconnect fabric is disclosed. In one embodiment, the computerized node includes: a direct memory access (DMA) engine, configured to generate data packets using descriptor information including fabric address translation data; and a DMA descriptor ring, configured to store the descriptor information.

In one variant, the non-transparent interconnect fabric comprises a PCIe (Peripheral Component Interconnect express) compliant fabric, and the generated data packets comprise transaction layer packets (TLPs), and the DMA engine is configured to access both the DMA descriptor ring and a data storage address comprising the fabric address translation data in order to generate the data packets.

In another variant, the non-transparent interconnect fabric is configured to support a plurality of different endpoints; and the fabric address translation comprises use of a descriptor and LUT (lookup table). The utilization of the descriptor and LUT reduces a BAR (base address register) space associated with the plurality of different endpoints in the aggregate relative to that required without the descriptor and LUT.

In an additional aspect of the disclosure, computer readable apparatus is described. In one embodiment, the apparatus includes a storage medium configured to store one or more computer programs, such as on an NT EP, host device or other processing entity associated with a PCIe fabric. In one embodiment, the apparatus includes a program memory or HDD or SSD and stores one or more computer programs supporting address translation and DMA engine operations within the fabric.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In a further aspect, an interconnect fabric device (including e.g., a NTB) configured to transmit data from one node to another node using data read and write processes.

In another aspect, an improved NT endpoint configuration is disclosed.

In yet a further aspect, a system employing one or more of the foregoing is disclosed.

These and other aspects shall become apparent when considered in light of the disclosure provided herein.

Figure 1:
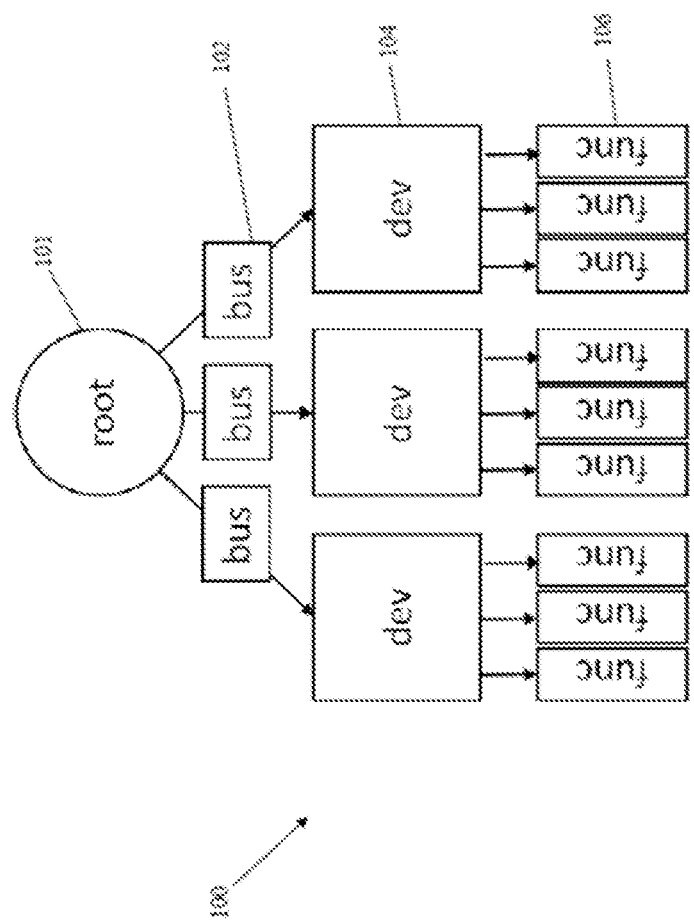
FIG. 1 illustrates a typical prior art PCIe
Figure 2:
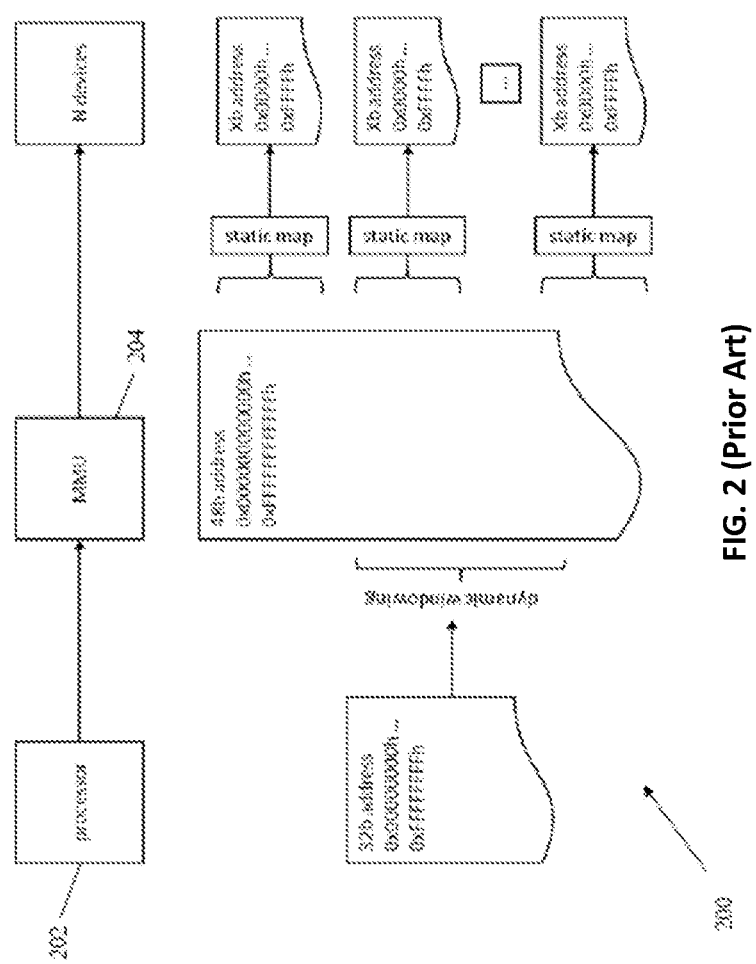
FIG. 2 illustrates a typical prior art PCIe memory-mapping architecture.
Figure 3:
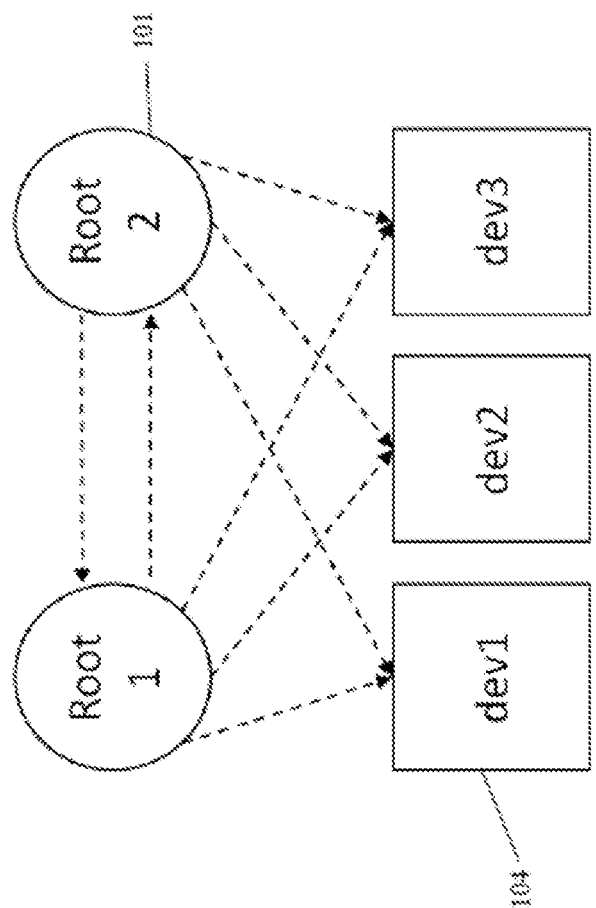
FIG. 3 illustrates PCIe NTBs that allow roots to communicate with one another.
Figure 4:
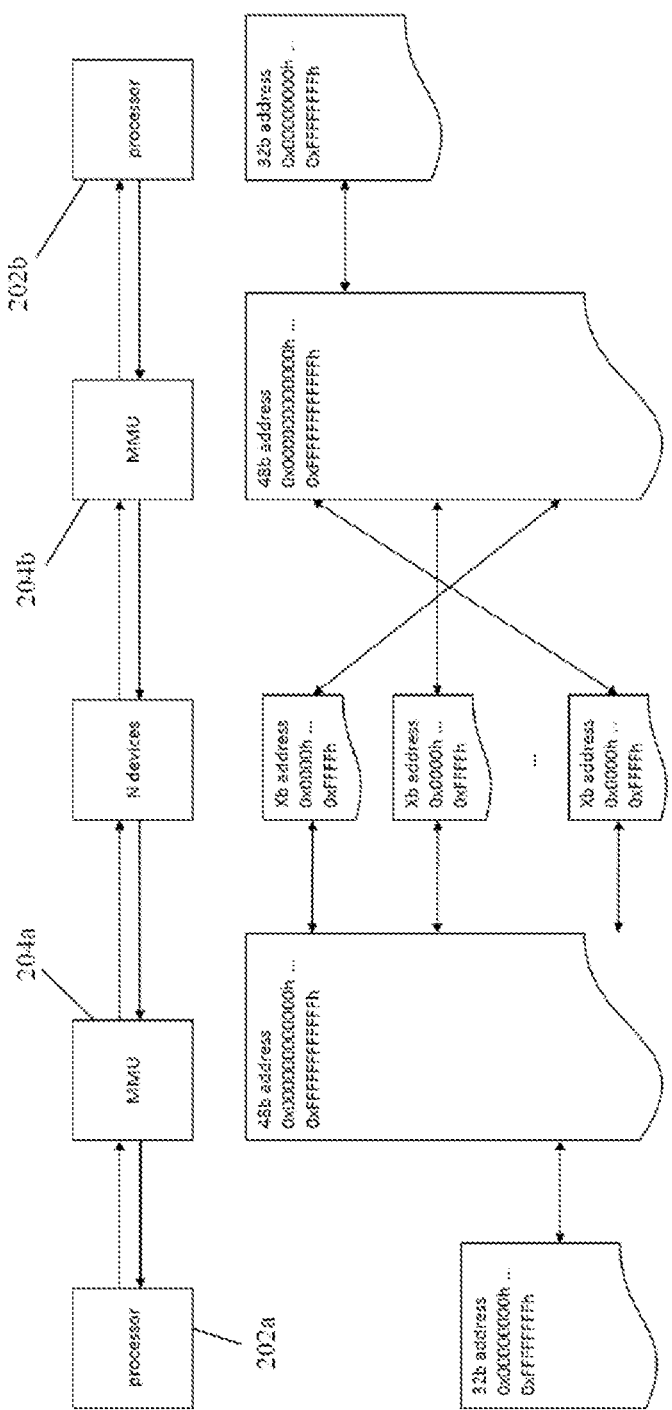
FIG. 4 illustrates processors with their own memory-maps implemented via their respective MMUs.
Figure 5:
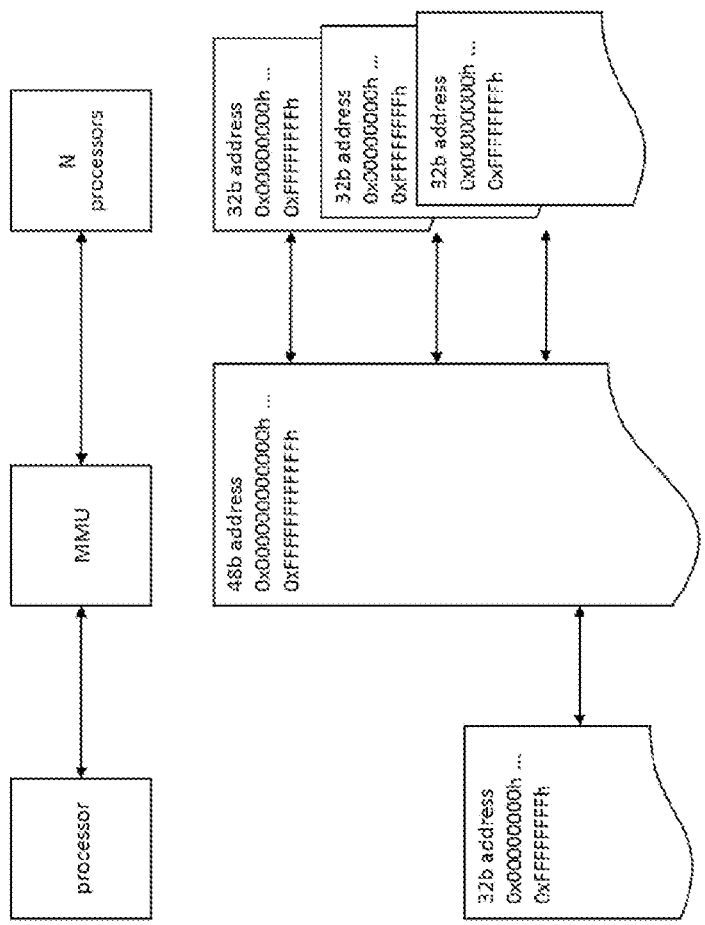
FIG. 5 illustrates existing implementations of NTB (non-transparent bridge) technology.

All figures disclosed herein in are © Copyright 2019-2020 GigaIO, Inc. All rights reserved.

DETAILED DESCRIPTION

Reference is now made to the drawings wherein like numerals refer to like parts throughout.

As used herein, the term "computer program" or "software" is meant to include any sequence or human or machine cognizable steps which perform a function. Such program may be rendered in virtually any programming language or environment including, for example, C/C++, Fortran, COBOL, PASCAL, Python, Ruby, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like, as well as VMs and containerized application environments such as Docker.

As used herein, the terms "device" or "host device" include, but are not limited to, servers or server farms, set-top boxes (e.g., DSTBs), gateways, modems, personal computers (PCs), and minicomputers, whether desktop, laptop, or otherwise, as well as mobile devices such as handheld computers, GPUs (including GPU-based devices such as accelerator cards or GPU-based supercomputers), PDAs, personal media devices (PMDs), tablets, "phablets", smartphones, vehicle infotainment systems or portions thereof, distributed computing systems, VR and AR systems, gaming systems, or any other computerized device.

As used herein, the term "memory" includes any type of integrated circuit or other storage device adapted for storing digital data including, without limitation, ROM, PROM, EEPROM, DRAM, SDRAM, DDR/2/3/4/5/6 SDRAM, EDO/FPMS, RLDRAM, SRAM, "flash" memory (e.g., NAND/NOR), 3D memory, HBM/HBM2, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, GPUs (graphics processing units), microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal or data interface with a component or network including, without limitation, those of the PCIe, FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), InfiniBand, and NVLink families.

As used herein, the term PCIe (Peripheral Component Interconnect Express) refers without limitation to the technology described in PCI-Express Base Specification, Version 1.0a (2003), Version 1.1 (Mar. 8, 2005), Version 2.0 (Dec. 20, 2006), Version 2.1 (Mar. 4, 2009), Version 3.0 (Oct. 23, 2014), Version 3.1 (Dec. 7, 2015), Version 4.0 (Oct. 5, 2017), and Version 5.0 (Jun. 5, 2018), each of the foregoing incorporated herein by reference in its entirety, and any subsequent versions thereof.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, SSDs, optical media (e.g., CD-ROMs, Laserdiscs, Blu-Ray, etc.), or any other devices or media capable of storing content or other information.

Overview

The present disclosure describes methods and apparatus for, among other things, allowing data transactions through interconnect fabric and NT endpoints with high scalability of the fabric.

In one aspect, an architecture utilizing a descriptor effectively as a lookup table (LUT) is disclosed. A DMA descriptor for a DMA engine that is logically proximate with a non-transparent (NT) endpoint (EP) is used to provide both a translation channel and DMA engine functionality. In one implementation, a translation channel to each peer within the architecture is provided such that no NT configuration changes are required beyond initialization (which may be performed statically or dynamically one time).

The DMA engine includes in one embodiment an enhanced descriptor ring with more information than a conventional DMA engine descriptor ring. For example, a DMA engine descriptor ring of the present disclosure may include: a fabric address, an address or offset which is translated by a DMA engine configuration register or other translation facility, an ID of the target which is associated with an NT fabric base address.

The DMA descriptor provided with the extra information allows a DMA engine to read data in a particular location out of the local host's memory, create a TLP using the data, and route the TLP directly to a partition of NT fabric. Because the DMA descriptor provides the address translation and partition destination information directly to the DMA engine, the DMA engine can directly generate a TLP with the appropriate NT fabric routing information. In other words, this DMA engine configuration does not require an original TLP to first be written to a NT endpoint BAR space and edited within the NT EP, before being routed through the NT fabric. The NT EP BAR space is not utilized for data movement (e.g., it does not need to map all exposed host memory to its own BAR space), so each NT EP BAR only needs to be large enough for basic control and configuration registers and does not grow/shrink with the size of the NT fabric (and the number of connected host device). Thus, the fabric can be greatly scaled up.

Detailed Description of Exemplary Embodiments

Referring now to FIGS. 6A-9, exemplary embodiments of the apparatus and methods of the present disclosure are now described in detail. While these exemplary embodiments are described in the context of PCIe functionality such as that set forth in the PCIe Base Specification e.g., Revision 3.0, 4.0, or later, each incorporated herein by reference in its entirety) and certain aspects of PCIe-based systems such as e.g., those set forth in U.S. Pat. Nos. 9,448,957, 9,152,597, 8,868,777, and 8,463,934, each entitled "Unified system area network and switch" and incorporated herein by reference in its entirety, the various aspects of the present disclosure are in no way so limited, and in fact may be used in any number of other applications and/or system architectures or topologies (whether PCIe-based or otherwise), the foregoing being merely exemplary. For example, the embodiments described herein should not be construed to limit channel movement only to PCIe data transactions; rather, a variety of different configuration and data cycles could pass through such a channel, using an engine as described herein, including e.g., in systems or devices based on Gen-Z, NVLink, and other protocols, as well as in the context of PCIe' s own ability to "piggy-back" on vendor-specific protocols.

Figure 6A:
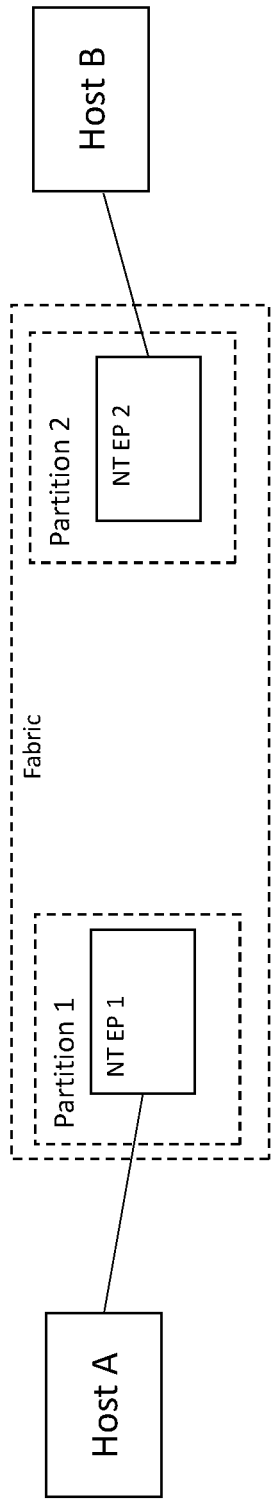
FIG. 6A illustrates an NTB fabric connected to a plurality of host devices.
Figure 6B:
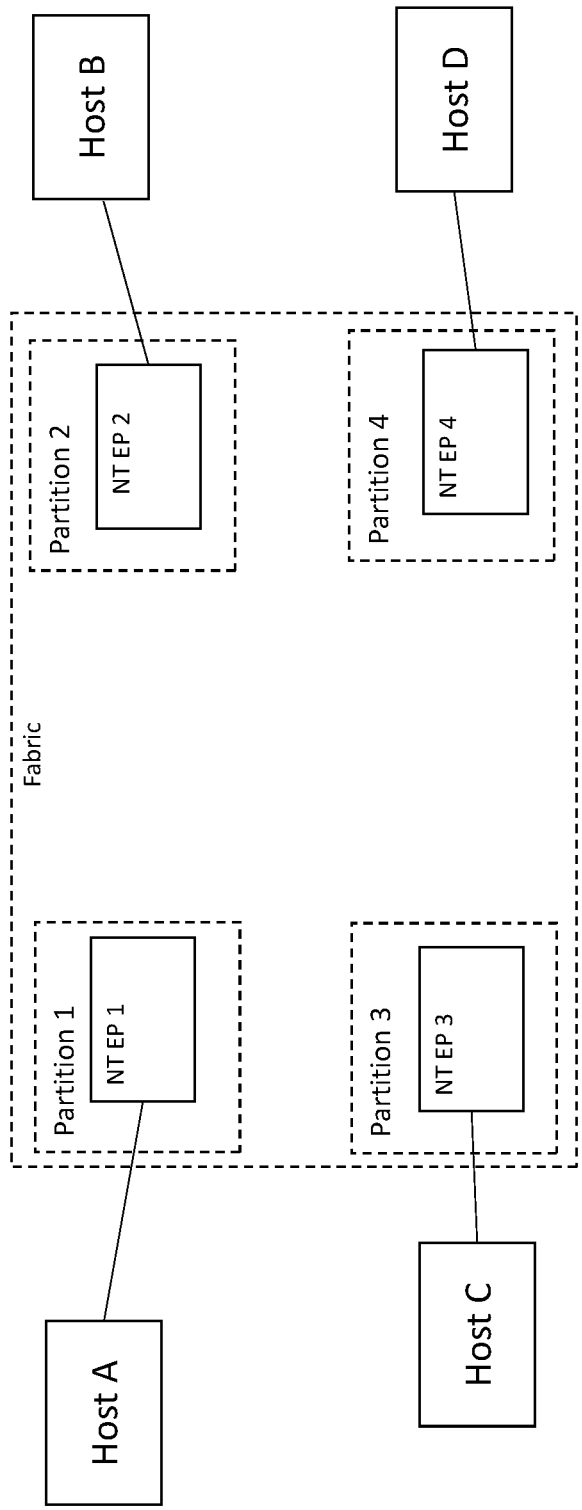
FIG. 6B illustrates another configuration of an NTB fabric connected to a plurality of host devices.

In order to provide context, FIGS. 6A and 6B are simplified illustrations of typical configurations of NT fabric connected to several host devices. The NT fabric contains "partitions", each of which is a chunk of the fabric including a PCIe port and a non-transparent bridge endpoint (NTB EP or NT EP). Each partition has an associated address within the fabric (i.e., the address of its NT EP). A host plugged into the port of a partition performs fabric interactions with other devices through its partition. Between the partitions, there is a PCIe interconnect fabric used to e.g., route data between the different hosts (not shown in detail).

Each NT EP in a partition of the NT fabric contains its own BAR (base address register) space. Each BAR can be associated with either a Lookup Table (LUT), a Direct Window (DW), or both. These elements provide Address Translation for traffic to be routed from one PCIe domain to another through the fabric. The address translation may be implemented with a direct window (DW) (e.g., 32 Gb-worth of PCIe BAR translation space) and a Lookup table (LUT) entry (including a translation configuration).

Figure 6C:
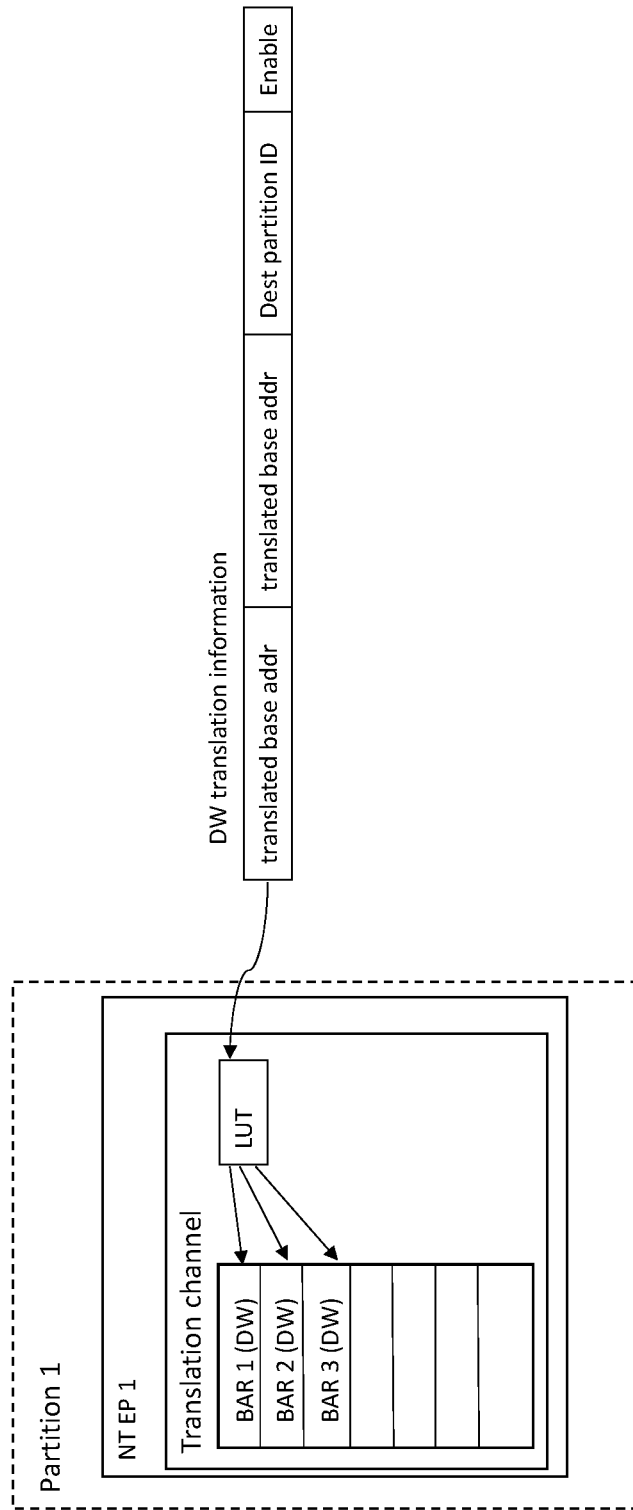
FIG. 6C illustrates a partition of NTB fabric including a translation channel.

For example, a translation configuration for a particular address range inside the translation space can indicate that a particular address translation and routing needs to be performed on any TLP that gets written to the particular address range. FIG. 6C shows an NT endpoint with a translation channel, with DWs and a LUT. An exemplary Lookup Table (LUT) entry format contains a 64 bit Base Address to the destination memory, a destination partition ID, and an enable bit. The address is used to translate the incoming TLP address reference to the actual destination memory address. TLPs passing through the Translation Frame are modified and routed to one or more NT fabric partitions.

Figure 6D:
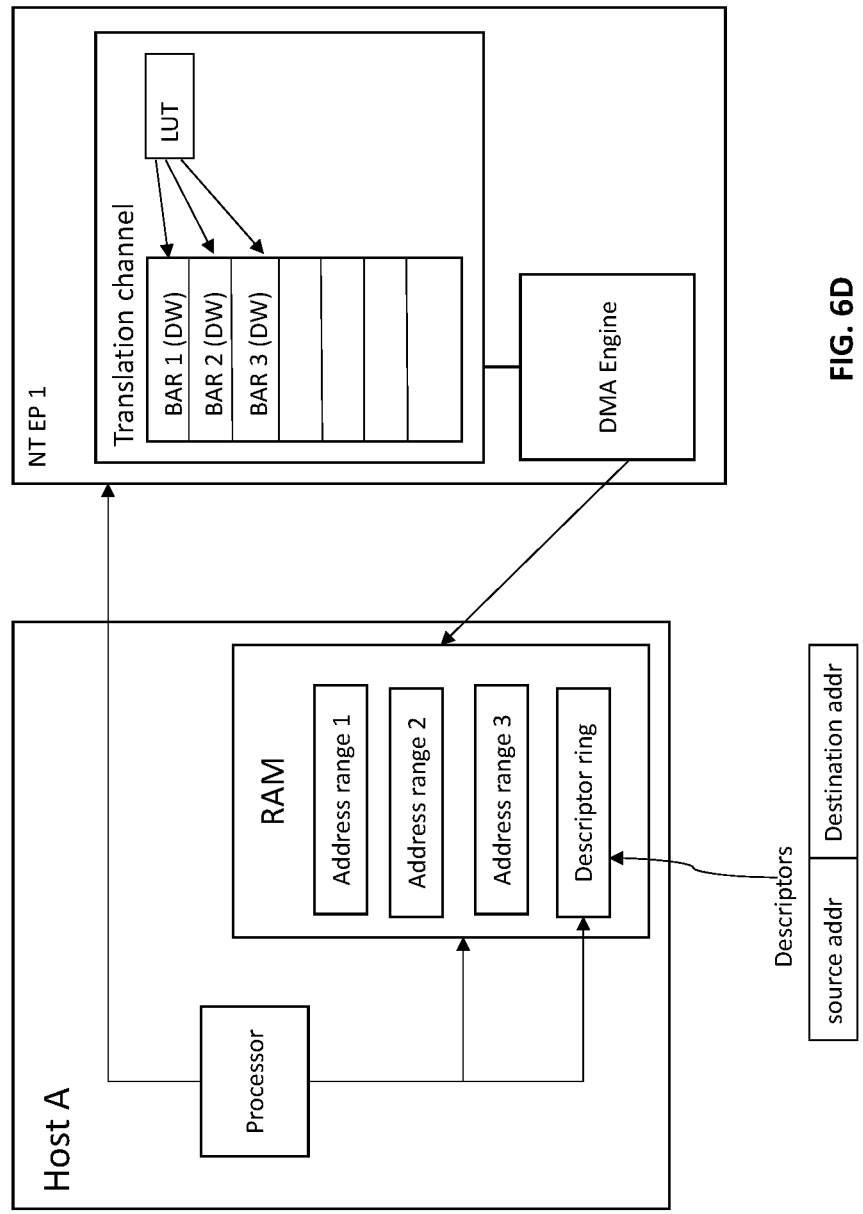
FIG. 6D illustrates a host device connected to a partition of NTB fabric, including a DMA (direct memory access) engine.

As will be appreciated by those of ordinary skill given this disclosure (and as previously described herein), data movement to/from a PCIe device is handled by DMA engine within the device (e.g., a DMA engine moves data between host memory and memory that resides in the NT fabric). A DMA engine typically includes descriptors in a descriptor ring/ring buffer (registers inside the DMA hardware or host memory). An application process running on a host can move data between host memory and the NT fabric by writing a DMA data structure into the descriptor ring. The DMA engine process looks into the descriptor ring for a new entry, reads the source and destination addresses of the entry, and executes the data movement (e.g., moving TLP from the host memory to the NT EP BAR space, performing address translation/editing, and sending out edited TLP to another NT fabric partition). The DMA engine may be located within the host CPU, inside an NT endpoint, or closely associated with an NT EP. For instance, the DMA engine in FIG. 6D is located in an NT EP and can perform the data movement by accessing a descriptor ring (e.g., located on host A memory), accessing a host memory location (where relevant data is located), and generating TLPs with NT EP physical addresses using the translation channel.

Figure 7:
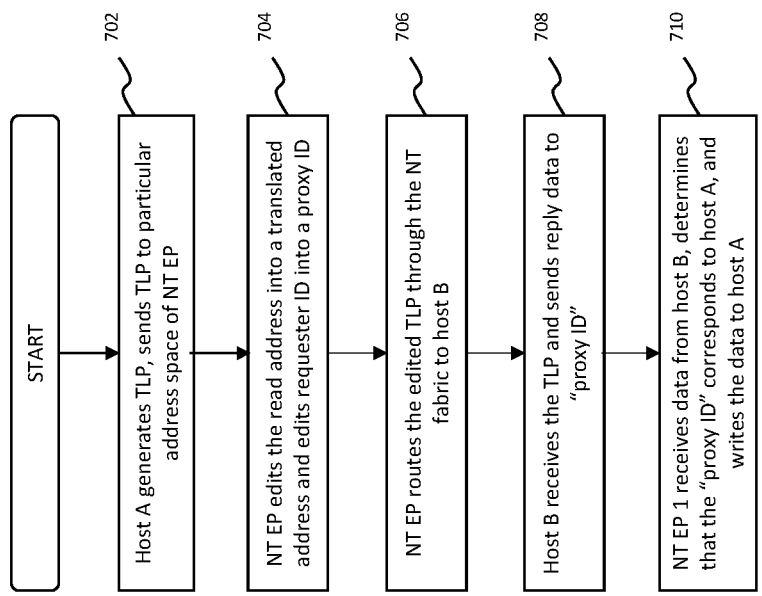
FIG. 7 is a logical flow diagram illustrating a process of sending data through NTB fabric from one host to another host.

FIG. 7 illustrates an exemplary data transfer process between e.g., Host A and Host B using an NTB fabric implemented using the architectures of FIGS. 6A-6D.

In step 702, Host A generates a source TLP with a destination address and a source ID (bus/device/function indicating host A), and sends the TLP to NT EP 1. Since Host A does not directly "see" Host B, the destination address is a particular physical address space in the BAR of NT EP 1 that corresponds to partition 2 (connected to Host B). Alternatively, step 702 and the generation of the TLP may be performed by the DMA engine (as shown in FIG. 6D). Host A may instruct the DMA engine, using the descriptor ring, to generate a TLP using data within Host A memory (e.g., in address range 1), with the Host A source ID, and with a particular NT EP memory address as the destination address.

In step 704, after the TLP enters NT EP 1 in partition 1, the TLP address is compared to BARs in NT EP 1. If the TLP falls within BAR 2 (for example), the associated address translation information (found in LUT entry that corresponds to BAR 2 space) is used to edit the TLP.

In step 704, the NT EP 1: i) edits the TLP such that the read address (the original physical BAR space read address) is changed to a translated address that may be used to route the TLP through the fabric towards the partition of host B, and ii) edits the requester ID into a proxy ID (the ID within NT EP 1 that corresponds to partition 1) that will be used in the response from Host B. Note that outside of NT EP 1, the proxy ID provided by NT EP 1 indicates that the requester is NT EP 1. However, internally, the NT EP 1 should be able to associate the particular proxy ID to Host A.

In step 706, the NT EP 1 sends the TLP through the fabric to partition 2 and its egress NT EP 2.

In step 708, the receiving host (Host B) receives the edited TLP, determines that it is coming from one of its own endpoints, and sends a response to that endpoint (using the proxy ID supplied to it in the TLP).

In step 710, the NT EP 1 receives the reply TLP from Host B and determines that the reply TLP is destined for the proxy ID that corresponds to Host A (i.e., looks up the proxy ID in a look-up table), edits the reply TLP, and sends the reply to Host A.

In the data movement operation of FIG. 7, a data packet (e.g., TLP) is required to be locally stored to a particular memory location of a fabric node (a NT EP), and edited by the node, in order to be correctly routed through the NT fabric. This might otherwise require the node to have very large amounts of BAR space (corresponding to all the host devices connected to the fabric and address translation information for those devices) and thus limits the number of host devices which may be connected to the fabric. However, the foregoing large BAR issues are avoided in the exemplary configurations disclosed herein by logically combining the address translation channel and the DMA engine (TLP generation) portions of non-transparent data movement in one NT fabric component, as now described in greater detail with respect to FIGS. 8A-9.

In the exemplary embodiments of the disclosure, the above-referenced address translation channel and the DMA engine together comprise a "block" of non-transparent data movement. Channel translation and TLP generation are combined within a DMA engine by explicitly providing a DMA descriptor with translation channel and engine information, e.g., the address translation rule and the destination partition. In some embodiments, Translation Channel information may include for example: Translation Channel PCIe Physical Address Range, Translation Channel Size (e.g., 64

KiB, 4 MiB, etc.), Translation Channel Translation Base Address, Translation Channel Translation Mask, Translation Channel Destination (i.e., partition), NT Fabric Requester ID. The Engine information may include for example: source address, destination address, size of transfer. This concept is illustrated in FIGS. 8A-8D and described below.

FIGS. 8A-8D show a host (Host A) having a processor and memory, connected to non-transparent fabric through a fabric node (NT EP 1). Unlike the approach of FIG. 6D, the NT EP 1 does not specifically "carve out" portions of its physical BAR space to be mapped to all the other hosts attached to the NT fabric (i.e., in order for Host A to write/read to the other host devices). Instead, Host A uses in one implementation an enhanced DMA engine and DMA descriptor ring in order to transfer data directly to the NT fabric.

Figure 8A:
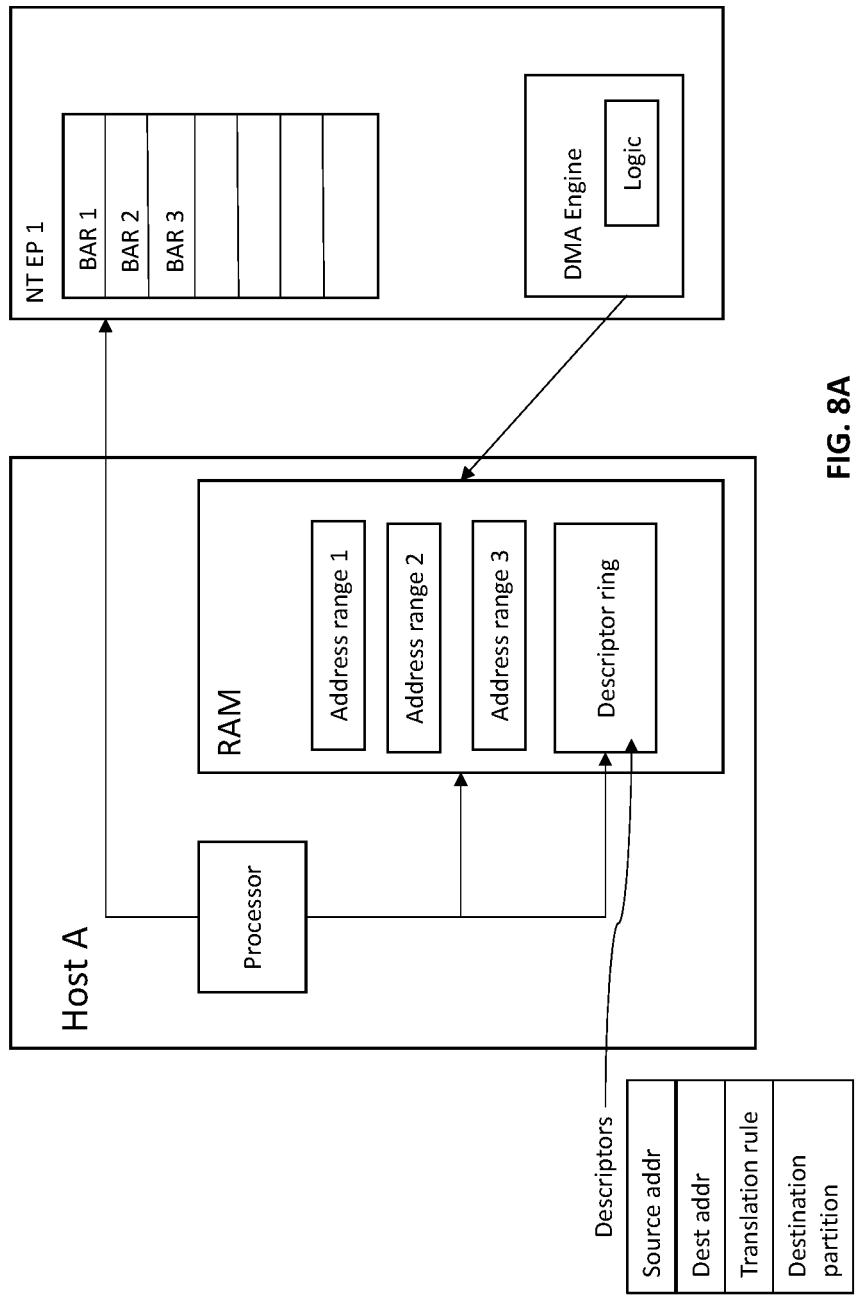
FIGS. 8A-8D illustrate exemplary embodiments of a host device connected to an NT endpoint and a DMA engine, in accordance with aspects of the present disclosure.

FIG. 8A shows part of an exemplary embodiment of an NT fabric architecture, where a host memory (e.g., RAM) includes an enhanced DMA descriptor ring into which descriptors may be written by the host A processor application. A DMA descriptor may be implemented as a look-up table (LUT) or other such data structure and may explicitly contain for example: i) a NT fabric partition address; ii) an address or offset which is translated by a DMA engine configuration register or other translation facility; and/or iii) an ID of the target which is associated with an NT fabric base address. In one implementation, a DMA descriptor can include a source address (address range within Host A's RAM), a translation rule, and a destination partition. The destination partition address may include one partition or multiple partitions (i.e., descriptor can indicate multicast operation). The various descriptors may be stored in e.g., a look-up table located on NT EP 1 (accessed by host A processor) or stored in memory of host A (e.g., provided to host A at startup). For example, this can be done with a particular NT LUT/DW (look-up-table/direct window) configuration, which effectively provides a sufficient Translation Channel to each peer such that no NT configuration changes are required beyond initialization (which could be done statically or dynamically one time).

A DMA engine may be located at the node of partition 1 (NT EP 1) and have access to Host A memory, including the DMA descriptor ring. Note that FIG. 8A shows one DMA engine and one descriptor ring, however, in another variant, multiple DMA engines and/or multiple descriptor rings may be used by Host A and/or by the NT EP 1. In yet another variant, multiple descriptor rings may be connected to one DMA engine, and different descriptor rings may correspond to different types of data movement operations.

Figure 8B:
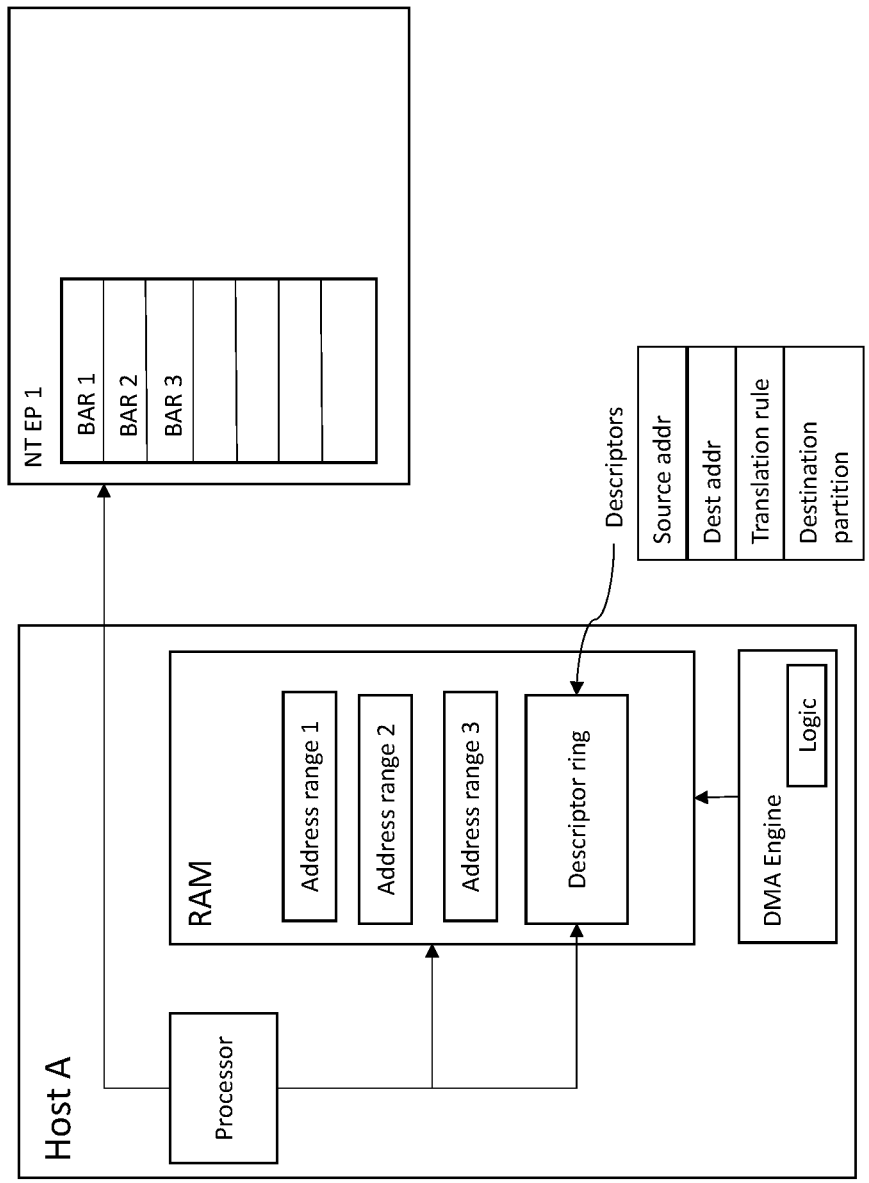

In another embodiment, as shown in FIG. 8B, a DMA engine may be located within Host A. The DMA engine may access memory locations and descriptor ring of its host, generate TLPs, and transmit the TLPs to the NT fabric using NT EP 1.

Figure 8C:
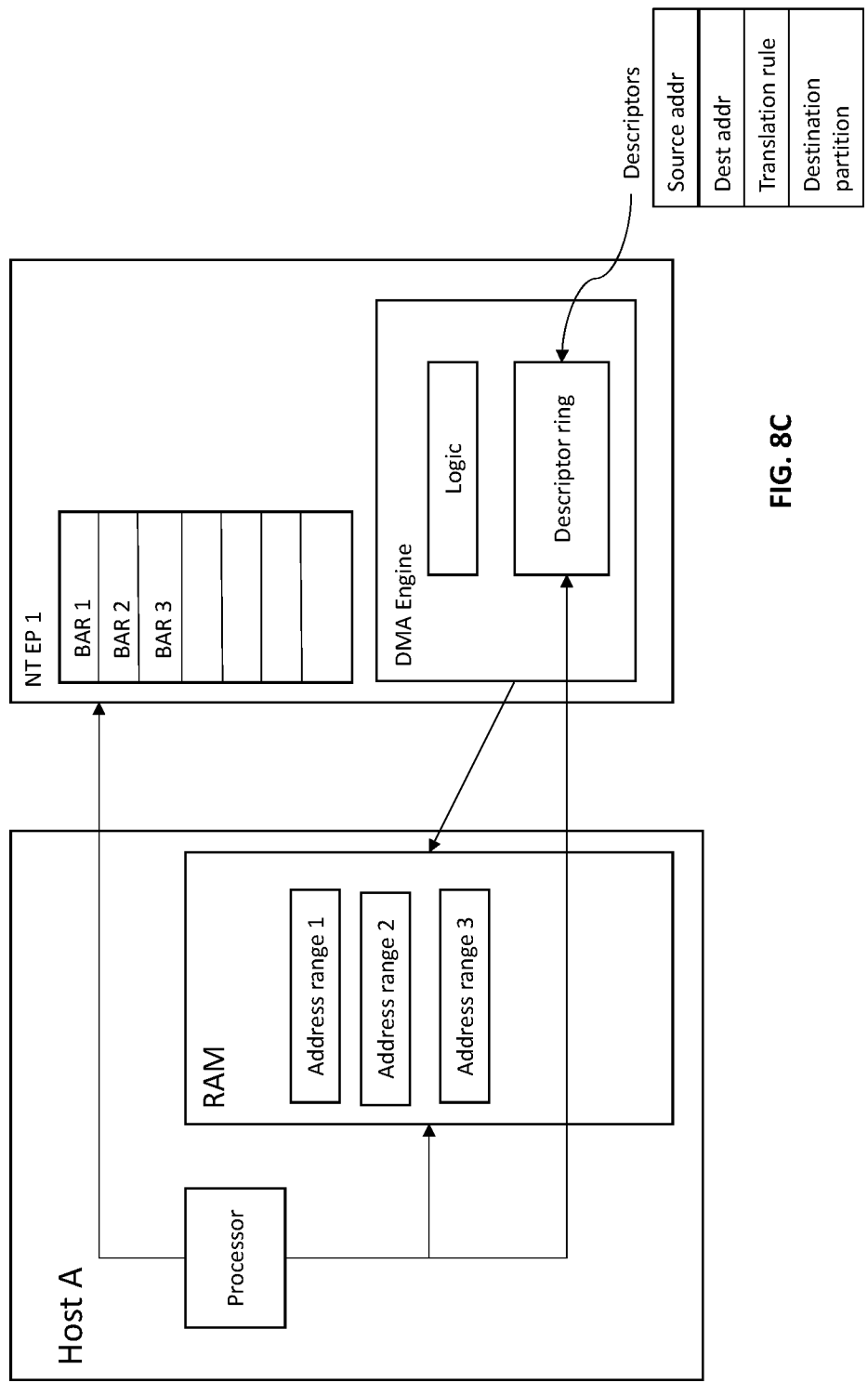

In another embodiment, FIG. 8C shows DMA engine and DMA descriptor ring may both be located at an NT fabric node, and a host device can write to the descriptor ring in NT EP 1. As shown in FIG. 8C, the DMA engine has access to its own descriptor ring and address ranges within host A memory. The DMA engine of NT EP 1 can generate data packets and transmit them to other portions of the NT fabric.

Figure 8D:
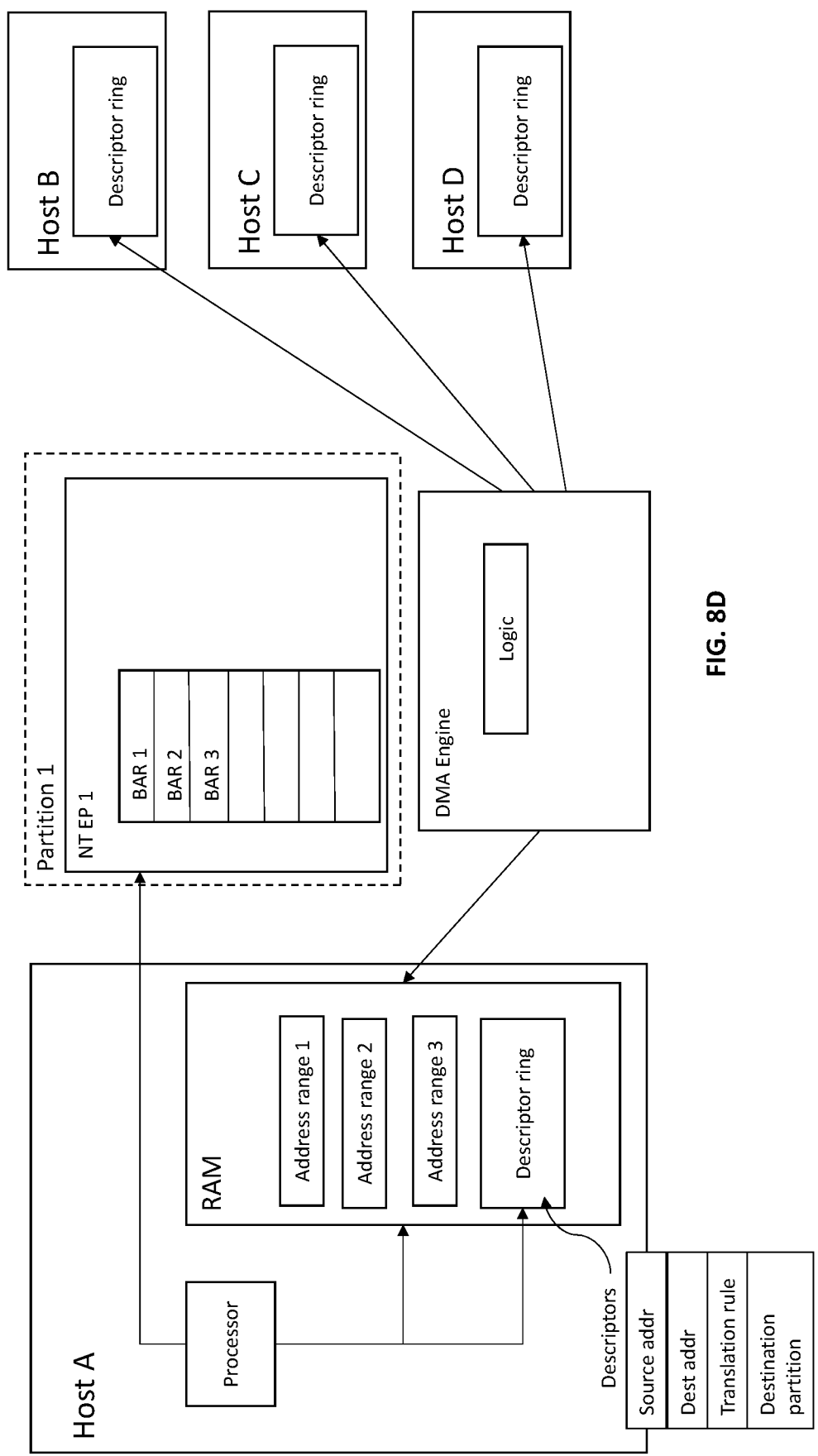
Figure 9:
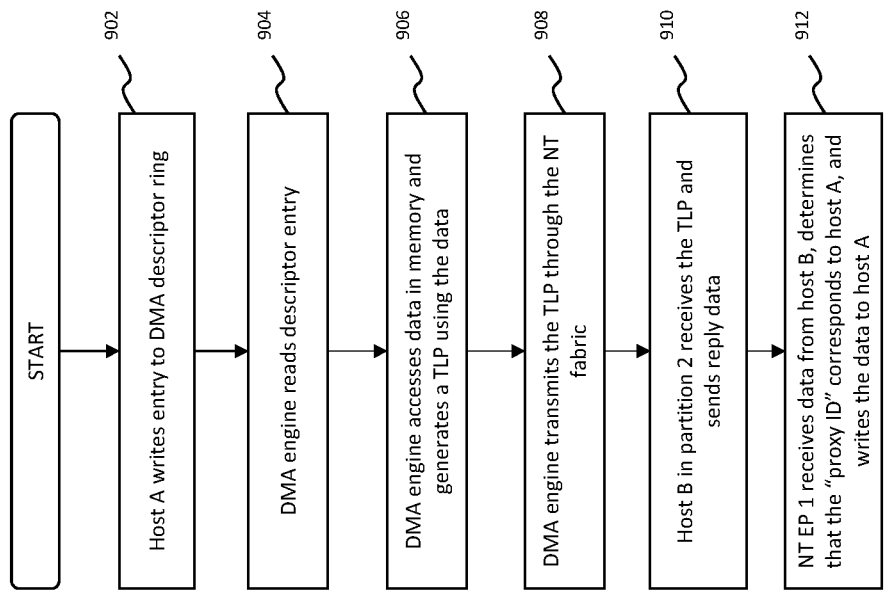
FIG. 9 is a logical flow diagram illustrating one embodiment of a process of sending data through NTB fabric using NTB architecture of FIGS. 8A-8D.

In another embodiment, FIG. 8D shows that a DMA engine may be independent of any host or partition, and may communicate directly with multiple descriptor rings on multiple host devices.

FIG. 9A shows an exemplary embodiment of a process that may be used with the embodiments of FIGS. 8A-8D, where data is moved from Host A to Host B through e.g., an NTB fabric.

In step 902, a host processor writes an entry to a DMA descriptor buffer ring. In one implementation, the descriptor includes a base address, an address translation rule, and a destination partition. For example, the descriptor may indicate that data needs to be accessed at address range 1 of Host A, that the data needs to be transmitted/written to address range 2 of Host B, that the source ID needs to indicate partition 1 (NT EP 1), and that Host B is located in partition 2. It will be appreciated by those of ordinary skill given this disclosure that as used herein, the term "partition" may take on any number of different definitions, including without limitation both logical and/or physical partitions. Moreover, multiple devices or entities may be allocated to a single partition, and conversely multiple partitions may be allocated to a single device or entity.

In step 904, a DMA engine finds and reads out an entry in the DMA descriptor.

In step 906, the DMA engine uses the information from the read descriptor to generate a data packet (TLP). For example, the DMA engine can access data located in address range 1 and create a TLP using the data, with header information provide in the descriptor. There is no need to first generate an original TLP and then edit the TLP using address translation information, since the address translation information is provided to the DMA engine in the descriptor.

In step 908, the DMA engine transmits the TLP through the NT fabric (from the fabric node NT EP 1). The NT fabric uses the TLP header information to route the packet to the correct partition (e.g., partition 2).

In step 910, Host B receives the TLP through the NT fabric and sends a reply TLP to partition 1, as indicated in the source TLP.

In step 912, NT EP 1 receives the reply TLP from the NT fabric and writes the received data to a memory queue within Host A. Advantageously, there is no need for the NT EP 1 to translate a "proxy ID" into corresponding Host A, as in the approach discussed with respect to FIG. 7.

A descriptor which contains valid host and NT fabric starting addresses, as well as valid transfer limit and fabric destination, completely suffices to produce the identical effect of the two separate processes/constructs (translation channel and engine). The DMA engine is interfacing directly (or effectively) on the NT fabric (its address space and protocol), rather than being located in the host RC (receive) side of the NT EP, and thus, it can directly transact in the NT fabric transaction/address domain. Advantageously, no PCIe NT EP Base Address Register address space is required to provide these Translation Channels.

It will be appreciated that while aspects of the present disclosure are cast in terms of PCIe-based "fabrics" comprised of a plurality of devices interconnected via e.g., cabling or similar physical layer, the aspects of the disclosure may also be applied to other types of applications including, without limitation, memory or other data fabrics or even crossbar technologies, such as for example those utilizing CCIX (Cache Coherent Interconnect for Accelerators) or Gen-Z technology.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method of operating a data fabric, the data fabric providing data communication between a plurality of devices, the method comprising:
   receiving from a first device of the plurality of devices and via a non-transparent endpoint (NT EP), a packet at a first address space, the receiving of the packet at the first address space comprising receiving a transaction layer packet (TLP) addressed to a physical address of a base address register (BAR) of the NT EP;
   using at least the NT EP, producing an edited received packet by at least:
      (i) editing a read address of the received packet to a first translated address; and
      (ii) editing a first identifier associated with the received packet to a second identifier;
   routing the edited received packet through at least part of the data fabric to a second device of the plurality of devices;
   receiving a reply to the routed edited received packet; and
   causing writing data associated with the reply to a location, the location being at least one of (i) associated with the first device, or (ii) accessible by the first device;
   wherein the TLP is not required to first be written to the BAR of the NT EP before the routing.

2. The method of claim 1, wherein the routing of the edited received packet through the at least part of the data fabric to the second device comprises routing the TLP to a second NT EP in data communication with the second device.

3. The method of claim 1, wherein the editing of the read address of the received packet to the first translated address is based at least in part on the first address space.

4. The method of claim 3, wherein the editing, based at least in part on the first address space comprises using translation data within a lookup table (LUT) associated with a BAR space.

5. The method of claim 1, wherein:
   the editing of the first identifier associated with the received packet to the second identifier comprises editing a requester identifier into a proxy identifier; and
   the receiving of the reply to the routed edited received packet comprises receiving the reply based at least on the proxy identifier.

6. The method of claim 5, wherein the causing of the writing data associated with the reply to the location further comprises correlating the proxy identifier to the first device.

7. A computer readable apparatus comprising a non-transitory storage medium having at least one computer program thereon, the at least one computer program configured to, when executed:
   receive, at a DMA (direct memory access) process, an entry issued from a first device associated with a first NT EP (non-transparent endpoint) in data communication with a data fabric;
   read at least the received entry using the DMA process;
   based at least on the reading, access first data within a prescribed address range of a memory;
   generate, by the DMA process, at least one TLP (transaction layer packet) based at least on the accessed first data;
   cause transmission of the at least one TLP via at least the data fabric to a second device associated with a second NT EP in data communication with the data fabric;
   evaluate a received response to the at least one TLP, the response issued by at least one of (i) the second device or (ii) the second NT EP; and
   based at least on the evaluation, cause provision of at least part of the received response to a location, the location being at least one of (i) associated with the first device, or (ii) accessible by the first device.

8. The computer readable apparatus of claim 7, wherein the DMA process comprises a descriptor ring and a DMA engine.

9. The computer readable apparatus of claim 7, wherein the generation of the at least one TLP comprises (i) utilization of a source ID value associated with the first device for the TLP; and (ii) utilization of a particular NT EP (non-transparent endpoint) memory address as a destination address for the TLP.

10. The computer readable apparatus of claim 7, wherein the causation of the transmission of the at least one TLP via at least the data fabric to the second device associated with the second NT EP comprises causation by the DMA process of the transmission of the TLP to the second NT EP.

11. The computer readable apparatus of claim 7, wherein the data fabric comprises a PCIe (Peripheral Component Interconnect express) compliant fabric.

12. A computerized apparatus in a PCIe (Peripheral Component Interconnect express) compliant data fabric, the computerized apparatus comprising:
   a direct memory access (DMA) descriptor ring configured to at least temporarily store descriptor information; and
   a DMA engine configured to (i) access the DMA descriptor ring to obtain descriptor data comprising fabric address translation data; and (ii) generate transaction layer packets (TLPs) based at least on the access;
   wherein the PCIe compliant data fabric comprises a non-transparent interconnect fabric configured for data communication with a plurality of different non-transparent endpoints.

13. The computerized apparatus of claim 12, wherein the fabric address translation data is based at least on LUT (lookup table) data in order to reduce a BAR (base address register) space associated with the plurality of different non-transparent endpoints in an aggregate relative to that required without the LUT data.

14. A computerized apparatus in a PCIe (Peripheral Component Interconnect express) compliant data fabric, the computerized apparatus comprising:
- a direct memory access (DMA) descriptor ring configured to at least temporarily store descriptor information; and
- a DMA engine configured to (i) access the DMA descriptor ring to obtain descriptor data comprising fabric address translation data; and (ii) generate transaction layer packets (TLPs) based at least on the access;
- wherein the direct memory access (DMA) descriptor ring and the DMA engine are each part of a non-transparent endpoint apparatus in data communication with the PCIe compliant data fabric.

15. A computerized apparatus in a PCIe (Peripheral Component Interconnect express) compliant data fabric, the computerized apparatus comprising:
- a direct memory access (DMA) descriptor ring configured to at least temporarily store descriptor information; and
- a DMA engine configured to (i) access the DMA descriptor ring to obtain descriptor data comprising fabric address translation data; and (ii) generate transaction layer packets (TLPs) based at least on the access;
- wherein use of the descriptor data comprising the fabric address translation data is configured to reduce base address register (BAR) space associated with a plurality of different non-transparent endpoints in data communication with the PCIe compliant data fabric in an aggregate relative to that required without the use of the descriptor data.

16. The computerized apparatus of claim 15, wherein the use of the descriptor data comprising the fabric address translation data is configured to reduce the BAR space associated with the plurality of different non-transparent endpoints based on an obviation of a necessity for the TLPs to be first written to the BAR space associated with the plurality of different non-transparent endpoints before being routed to PCIe compliant data fabric.

\* \* \* \* \*